(12) United States Patent
Higuchi

(10) Patent No.: US 8,181,730 B2
(45) Date of Patent: May 22, 2012

(54) COLLISION DETECTION DEVICE FOR VEHICLE

(75) Inventor: Hiroshi Higuchi, Kariya (JP)

(73) Assignee: Denso Corporation, Kariya (JP)

( * ) Notice: Subject to any disclaimer, the term of this patent is extended or adjusted under 35 U.S.C. 154(b) by 341 days.

(21) Appl. No.: 12/660,276

(22) Filed: Feb. 24, 2010

(65) Prior Publication Data

US 2010/0212989 A1  Aug. 26, 2010

(30) Foreign Application Priority Data

Feb. 25, 2009 (JP) .................................. 2009-42111

(51) Int. Cl.
*B60R 21/01* (2006.01)
(52) U.S. Cl. ............................. 180/274; 280/735; 701/45
(58) Field of Classification Search .................. 280/735; 180/274; 701/45
See application file for complete search history.

(56) References Cited

U.S. PATENT DOCUMENTS

| | | | | |
|---|---|---|---|---|
| 5,544,716 | A * | 8/1996 | White ........................... | 180/274 |
| 5,748,075 | A * | 5/1998 | Dirmeyer et al. .............. | 340/436 |
| 7,236,866 | B2 | 6/2007 | Takafuji et al. | |
| 2002/0145273 | A1 * | 10/2002 | Foo et al. ...................... | 280/735 |
| 2004/0099462 | A1 * | 5/2004 | Fuertsch et al. .............. | 180/274 |
| 2006/0237255 | A1 | 10/2006 | Wanami et al. | |
| 2006/0244245 | A1 * | 11/2006 | Nonaka et al. ................. | 280/735 |
| 2006/0276965 | A1 * | 12/2006 | Ide .................................. | 701/301 |
| 2008/0249687 | A1 * | 10/2008 | Le et al. .......................... | 701/45 |
| 2009/0020353 | A1 * | 1/2009 | Kiribayashi ................... | 180/274 |
| 2010/0179731 | A1 * | 7/2010 | Le et al. .......................... | 701/47 |
| 2010/0213693 | A1 * | 8/2010 | Foo et al. ....................... | 280/735 |
| 2011/0148082 | A1 * | 6/2011 | Kohler et al. .................. | 280/735 |

FOREIGN PATENT DOCUMENTS

| | | |
|---|---|---|
| JP | 7-508950 | 10/1995 |
| JP | 11-500218 | 1/1999 |
| JP | 2004-148864 | 5/2004 |
| JP | 2005-156528 | 6/2005 |
| JP | 2005-262965 | 9/2005 |
| JP | 2006-306155 | 11/2006 |
| JP | 2007-263601 | 10/2007 |
| WO | WO 2006/037680 | 4/2006 |

* cited by examiner

*Primary Examiner* — Ruth Ilan
(74) *Attorney, Agent, or Firm* — Harness, Dickey & Pierce, PLC

(57) ABSTRACT

A collision detection device for a vehicle includes an air chamber space, a pressure sensor and a collision determination portion. The air chamber space is arranged in the vehicle, and a pressure therein is changed in accordance with a collision with the vehicle. The pressure sensor detects a pressure change in the air chamber space. The collision determination portion determines the collision with the vehicle. An output value of the pressure sensor is integrated by time to calculate an integration value, and the collision with the vehicle is determined based on a threshold value set with respect to the integration value, and the output value of the pressure sensor. Therefore, when the collision with the vehicle occurs, whether an occupant protection device should be activated can be determined promptly.

5 Claims, 4 Drawing Sheets

| HORIZONTAL AXIS<br>CONDITION | TIME [ms] | INTEGRATION VALUE [ms] | DIFFERENCE [ms] |
|---|---|---|---|
| ON CONDITION 1 | 6.9 (T1) | 5.5 (T4) | -1.4 |
| ON CONDITION 2 | 7.5 (T2) | 6.1 (T5) | -1.4 |
| ON CONDITION 3 | 7.6 (T3) | 6.0 (T6) | -1.6 |

COLLISION DETECTION DEVICE FOR VEHICLE

CROSS REFERENCE TO RELATED APPLICATION

The present application is based on Japanese Patent Application No. 2009-42111 filed on Feb. 25, 2009, the disclosure of which is incorporated herein by reference.

FIELD OF THE INVENTION

The present invention relates to a collision detection device for a vehicle, configured to detect a collision of an object with a vehicle.

BACKGROUND OF THE INVENTION

A collision detection device for a vehicle is configured to detect a frontal collision or a side collision of a vehicle and to determine whether an occupant protection device should be activated. The occupant protection device includes, for example, an airbag, a seatbelt pretensioner and the like. The vehicle is configured to activate the occupant protection device based on the determination of the collision by the collision detection device so as to protect an occupant from impact of the collision. As an example of such a collision detection device for a vehicle, according to JP-A-2004-148864, multiple acceleration sensors are disposed and impact of a collision is detected as acceleration, and then, whether an occupant protection device is activated is determined. According to JP-A-2006-306155, which corresponds to US 2006/0237255, a pressure sensor is disposed in a door interior space of a vehicle and a pressure change in the door interior space in a collision is detected. In such a configuration, a side collision of the vehicle can be detected by the pressure sensor.

A collision detection device for a vehicle detects a collision with the vehicle by a pressure sensor or the like, and determines whether an occupant protection device should be activated with respect to the collision. In order to respond to various types of the vehicle collisions and to improve reliability of the occupant protection in the collision, the collision detection device needs to perform the determination promptly.

SUMMARY OF THE INVENTION

In view of the above points, it is an object of the present invention to provide a collision detection device for a vehicle, which can determine promptly whether an occupant protection device should be activated when a collision with the vehicle occurs.

According to one aspect of the present invention, a collision detection device for a vehicle, includes an air chamber space arranged in the vehicle, a pressure in the air chamber space being configured to be changed in accordance with a collision with the vehicle; a pressure sensor configured to detect a pressure change in the air chamber space; and a collision determination portion configured to determine the collision with the vehicle. An output value of the pressure sensor is integrated by time to calculate an integration value. The collision with the vehicle is determined based on a threshold value set with respect to the integration value, and the output value of the pressure sensor.

According to the above configuration, the collision with the vehicle can be detected, and whether an occupant protection device should be activated can be determined promptly. That is, response time from when the collision with the vehicle occurs till when the occupant protection device is activated can be shortened. Thus, the collision detection device can be applied to various types of collisions and appropriate treatment can be performed. Therefore, reliability of the occupant protection in the collision can be improved.

In a conventional collision detection device having a pressure sensor, a collision is determined by comparing an output value of the sensor and a predetermined threshold value as a constant. On the other hand, in the collision detection device of the present invention, the output value of the pressure sensor is integrated by time to calculate an integration value by the collision determination portion. With respect to the integration value, a threshold value in accordance with the integration value is set. A collision is determined based on the threshold value, which is obtained from the integration value as a variable number, and the output value of the pressure sensor. That is, in the collision detection device of the present invention, the threshold value is set in a different way from the conventional collision detection device. Therefore, compared with the conventional collision detection device, a collision that needs to activate an occupant protection device can be determined equally or more promptly in the collision detection device of the present invention.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Hereinafter, embodiments of the present invention that embody a collision detection device for a vehicle will be described with reference to drawings.

Embodiment

A collision detection device 1 for a vehicle according to the present embodiment will be described with reference to FIGS. 1 to 3.

Figure 1:
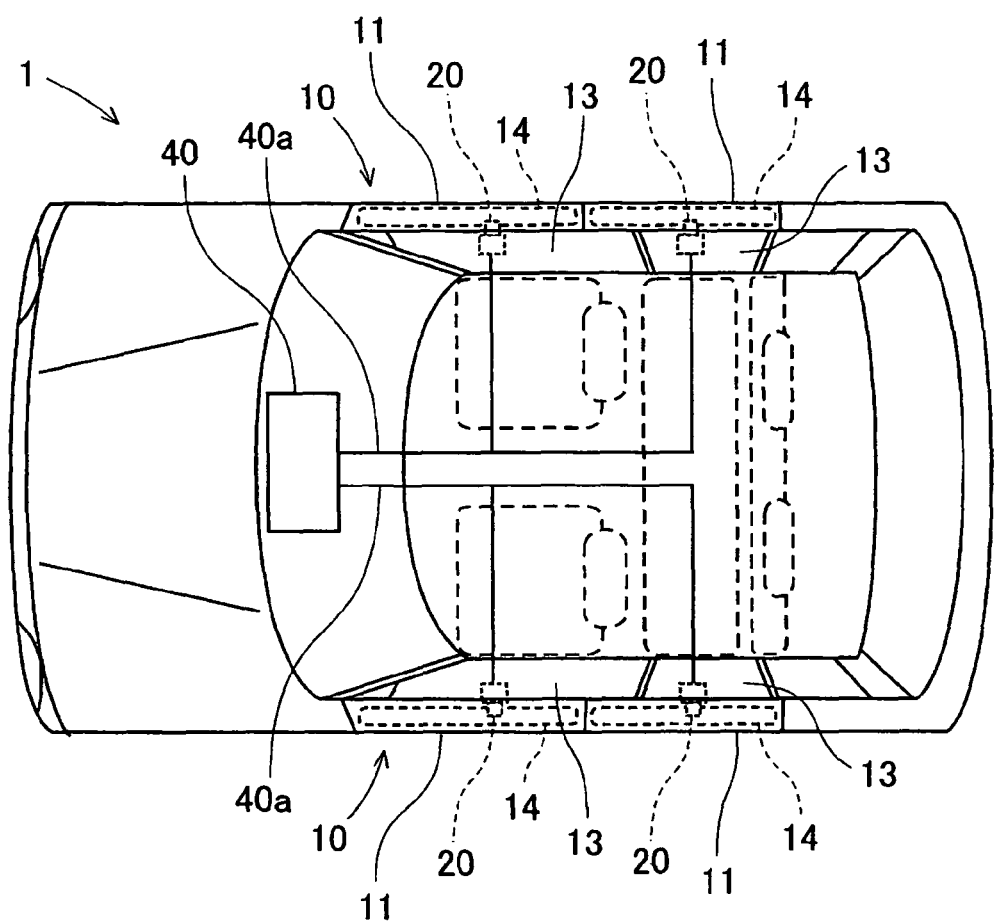
FIG. 1 is a top view showing a vehicle to which a collision detection device for a vehicle is mounted.
Figure 2:
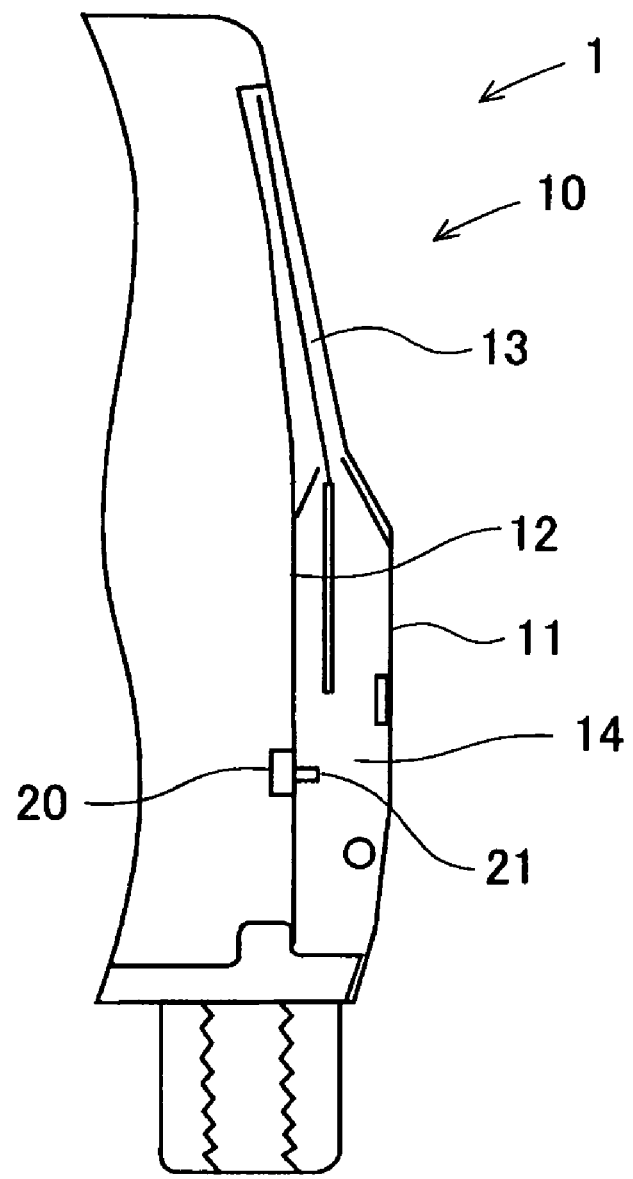
FIG. 2 is a cross-sectional view showing a door interior space of a vehicle door.

As shown in FIG. 1, the collision detection device 1 is mainly constructed of vehicle doors 10, pressure sensors 20, an occupant protection device 30 (not shown in FIG. 1) and a collision determination ECU 40, which corresponds to "a collision determination portion" of the present invention.

Each of the vehicle doors 10 is a side door configuring a side surface of a vehicle body, and includes an outer panel 11, an inner panel 12, a side glass 13 and a door interior space 14, which corresponds to "an air chamber space" of the present invention. In the present embodiment, the vehicle doors 10 are located at both sides of a front seat and a rear seat. The outer panel 11 is a panel arranged outside the vehicle and configures a part of the vehicle body. The inner panel 12 is a panel arranged inside the vehicle with a predetermined dimension separated from the outer panel 11. The side glass 13 is a window glass of the vehicle door 10, and is configured to be capable of sliding in an up-down direction by an open-close mechanism (not shown).

The door interior space 14 is located at a vehicle inner side of the outer panel 11 configuring the vehicle body, and corresponds to a space between the outer panel 11 and the inner panel 12. The door interior space 14 is provided in each of the vehicle doors 10 at both sides of the vehicle, and is configured to be capable of housing therein the side glass 13 in an open state. When an object collides with the outer panel 11 located at a vehicle outer side of the door interior space 14, a pressure change is generated in the door interior space 14. The door interior space 14 is an unsealed space and is capable of communicating with the external air. The configuration can maintain balance between a pressure in the door interior space 14 and a pressure of the external air even when a temperature in the vehicle door 10 or an atmospheric pressure is changed.

Each of the pressure sensors 20 is a sensor device that is capable of detecting a pressure of gas, and has a pressure detection opening 21. The pressure detection opening 21 is attached to the inner panel 12 to protrude into the door interior space 14, which is formed to have a hollow configuration. The pressure sensor 20 detects the pressure of gas in the door interior space 14 detected by the pressure detection opening 21, and sends a signal to the collision determination ECU 40 via a signal line 40a described below. As a result, the collision detection device 1 can detect the pressure change in the door interior space 14. In the present embodiment, each of the pressure sensors 20 is disposed in the door interior space 14 of each of the vehicle doors 10. Thus, each of the pressure sensors 20 detects the pressure change in the door interior space 14 of each of the vehicle doors 10.

The occupant protection device 30 is a device that reduces the impact against the occupant when the collision with the vehicle occurs. In the present embodiment, the occupant protection device 30 is subject to a side collision of the vehicle, and includes airbags such as a side airbag and a curtain airbag, and a drive circuit 31 configured to activate the airbags. The airbags are housed in a vehicle seat and a position from a front pillar to a roof-side portion. When the side collision with the vehicle occurs, the drive circuit 31 of the occupant protection device 30 receives an activation signal from the collision determination ECU 40 described below. Then, the airbags are activated by generating gas in an inflator (not shown).

The collision determination ECU 40 is an electronic control device for operating activation control of the occupant protection device 30. The collision determination ECU 40 is configured such that signals output from the pressure sensors 20 are input thereto via the signal lines 40a. The collision determination ECU 40 detects the collision with the vehicle based on the pressure change in the door interior space 14 detected by the pressure sensor 20. That is, the collision determination ECU 40 performs an operation for determining whether the occupant protection device 30 should be activated based on an output value of the pressure sensor 20. Further, the following configuration may be used. For example, in the case where a frontal collision of the vehicle is detected, in addition to the pressure detected by the pressure sensor 20, a vehicle speed detected by a vehicle speed sensor (not shown) is input into the collision determination ECU 40 and the frontal collision is detected based on the pressure and the vehicle speed.

Figure 3:
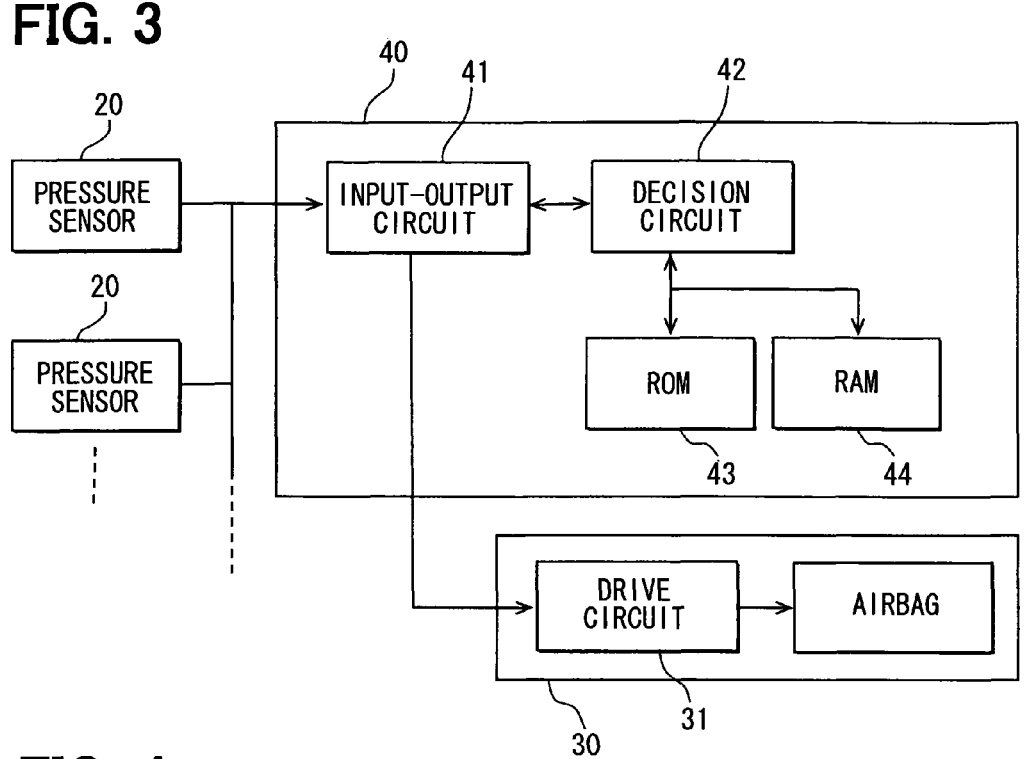
FIG. 3 is a block diagram showing a configuration of the collision detection device.

As shown in FIG. 3, the collision determination ECU 40 includes an input-output circuit 41, a decision circuit 42, a ROM 43 and a RAM 44. The input-output circuit 41 is configured such that a signal can be input and output between the pressure sensors 20 and the collision determination ECU 40, and between the drive circuit 31 of the occupant protection device 30 and the collision determination ECU 40. The output value of the pressure sensor 20 is input into the decision circuit 42. The decision circuit 42 determines whether the occupant protection device 30 should be activated, and outputs the determination into the input-output circuit 41. The ROM 43 stores a threshold value or the like necessary for the determination of the collision by the decision circuit 42. The RAM 44 stores various calculations and data by the decision circuit 42.

The determination of the collision in the present embodiment will be described. Firstly, a coefficient corresponding to the output value of the pressure sensor 20, which is input into the decision circuit 42, is obtained from the ROM 43. Then, a previous integration value, which has been calculated by integration using output values until a previous time prior to a set present time and is stored in the RAM 44, is multiplied by the coefficient to calculate a first integration value. Next, a pressure change amount is integrated by a time period between the previous time and the set present time to calculate a second integration value. The decision circuit 42 adds the first integration value and the second integration value to calculate an integration value at a present time. A threshold value that is set with respect to the integration value is obtained from the ROM 43, and the integration value is stored in the RAM 44.

The RAM 44 stores output values of the pressure sensor 20 that are sampled up until the present time. The decision circuit 42 obtains the output values of the pressure sensor 20, which are back to predetermined number of times from the present time, from the RAM 44. Next, a pressure change amount is calculated based on the obtained previous output values and the output value at the set present time. Then, the decision circuit 42 determines the collision with the vehicle by comparing the threshold value and the pressure change amount. Therefore, for example, in the case where the occupant protection device 30 is determined to have a need to be activated, the collision determination ECU 40 sends a signal to the drive circuit 31 so as to activate the airbags.

Figure 4:
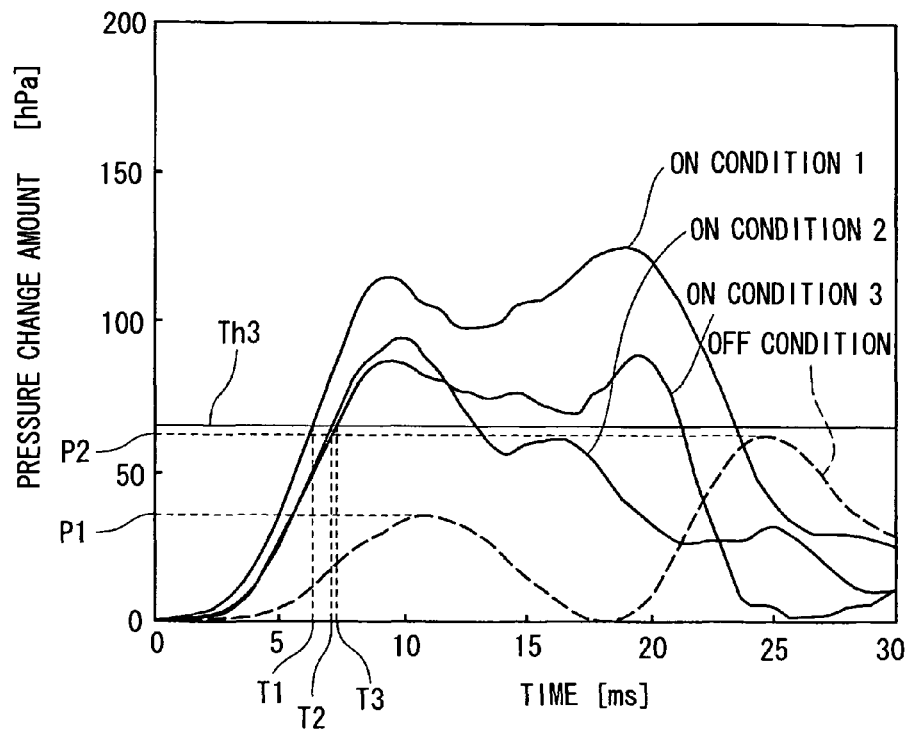
FIG. 4 is a graph showing a relationship between time and a pressure change amount in a collision test.
Figures 5, 6:
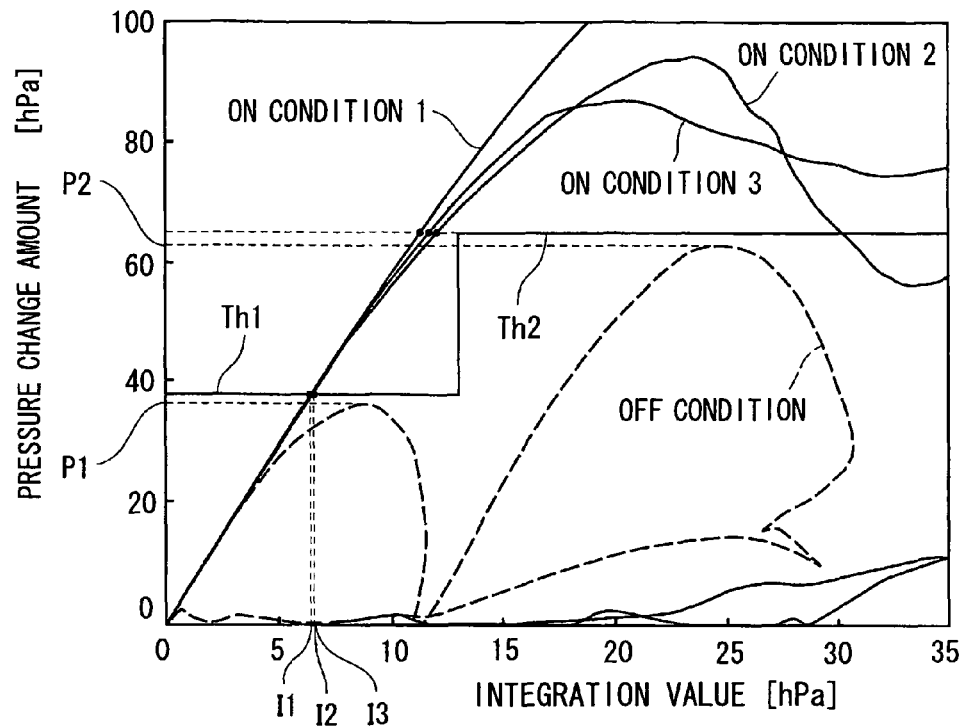
FIG. 5 is a graph showing a relationship between an integration value and the pressure change amount in the collision test.
FIG. 6 is a table showing an effect of the collision detection device.

Hereinafter, operations of the components of the collision determination ECU 40 will be described with reference to FIGS. 4 to 6. A collision that needs to activate the occupant protection device 30 is referred to as ON condition, and a collision that does not need to activate the occupant protection device 30 is referred to as OFF condition. In the present embodiment, a side collision test is performed. In the side collision test, a collision test truck (a moving barrier) having a barrier, which is outfitted with an aluminum honeycomb configured to be deformed in a collision, is made to be collided with a side surface of a vehicle. It is assumed that the collision test corresponds to the provisions of Article 18 of Safety Standards of Road Trucking Vehicle Law and Federal Motor Vehicle Safety Standards (FMVSS214).

When the collision test truck is collided with a test vehicle, the collision determination ECU 40 detects a pressure change in the door interior space 14 based on a pressure signal transmitted from the pressure sensor 20. In the collision test, when the collision test truck is collided with the test vehicle at different speeds of the ON conditions and the OFF condition, the relationships between the elapsed time and the pressure change amount P with a collision time used as a standard are indicated by curves shown in FIG. 4. According to such a collision test, in both the ON conditions and the OFF condition, each of the curves has multiple peaks in one region due to the structure of the vehicle door and the shape of the collision test truck. In a similar collision test, although there is a time interval in a maximum value and a distance between the peaks, the output value of the pressure sensor 20 is obtained as a substantially similar curve and shows an output characteristic shown in FIG. 4. The output characteristic corresponds to "an output characteristic of a pressure sensor" of the present invention.

The calculation of an integration value I based on the output value of the pressure sensor 20 by the collision determination ECU 40 will be described. Firstly, the collision determination ECU 40 stores the output value of the pressure sensor 20, which is input into the decision circuit 42 via the input-output circuit 41, in the RAM 44. The decision circuit 42 obtains a coefficient S corresponding to the output value detected at a set present time from the ROM 43. Further, the decision circuit 42 obtains a previous integration value I, which has been calculated by integration using the output values until a previous time prior to the set present time, from the RAM 44, and the previous integration value I' is multiplied by the coefficient S to calculate a first integration value Ia. In the present embodiment, the coefficient S obtained from the ROM 43 is set by comparing the output value of the pressure sensor 20 with a predetermined threshold value. When the output value at the set present time is equal to or higher than the threshold value, the coefficient S is set to be substantially 1. When the output value at the set present time is lower than the threshold value, the coefficient S is set to be a value lower than 1. That is, the coefficient S indicates the degree that the previous integration value I, which has been calculated by integration using the output values until the previous time, is counted in the integration value I at the set present time. Next, a pressure change amount P' between the output value at the previous time and the output value at the set present time is calculated as a second integration value Ib. The pressure change amount P' is integrated by the time period between the previous time and the set present time to calculate the second integration value Ib. The decision circuit 42 adds the first integration value Ia and the second integration value Ib to calculate the integration value I based on the output value at the set present time, and the integration value I is stored in the RAM 44.

In this manner, the integration value I can be easily calculated by using the previous integration value I, which has been calculated by integration using the output values until the previous time. The first integration value Ia is calculated by multiplying the previous integration value I' by the coefficient S. For example, if the previous integration value I' is determined to include an error or noise, the degree that the previous integration value I' is counted in the integration value I can be reduced by adjusting the coefficient S. Thus, in accordance with the output value of the pressure sensor 20 or the like, the more accurate integration value I can be calculated. Further, the coefficient S may be calculated from a predetermined function.

Further, in the present embodiment, the decision circuit 42 obtains previous output values, which are back to predetermined number of times from the present time, from the RAM 44. A period average is calculated from the obtained previous output values and the output value at the set present time. The period average corresponds to the pressure change amount P of the output value at the set present time. The present embodiment is intended to restrict the negative effect to the determination of the collision by the collision determination ECU 40 in the case where the output signal from the pressure sensor 20 includes noise or the like. For example, a low-pass filter may be applied to the output signal from the pressure sensor 20 to remove the noise, and then, the filtered output signal is output to the decision circuit 42. The pressure change amount P may be calculated based on the previous output values and the output value at the set present time. In this manner, by calculating the pressure change amount P based on the output values of the pressure sensor 20, the output values of the pressure sensor 20 that change slightly by the vibration due to running of the vehicle or change in the atmospheric pressure can be averaged.

Signals of the output values of the pressure sensor 20 are transmitted regularly. In the present embodiment, the output value is transmitted to the collision determination ECU 40 every 0.5 ms. That is, the calculation of the integration value I based on the output value of the pressure sensor 20 is performed every 0.5 ms. The relationships between the integration value I and the pressure change amount P are indicated by curves shown in FIG. 5. As is clear from FIG. 5, the output value of the pressure sensor 20 shows the similar output characteristic in the relationship between the integration value I and the pressure change amount P. Based on the output characteristic, threshold values Th1, Th2 set in advance with respect to the integration value I are stored in the ROM 43.

The decision circuit 42 obtains the threshold value Th1 or Th2 in accordance with the integration value I from the ROM 43. Then, the pressure change amount P of the output value at the set present time is compared with the threshold value Th1 or Th2. When the pressure change amount P is equal to or higher than the threshold value Th1 or Th2, the collision is determined to be in the ON condition. When the pressure change amount P is lower than the threshold value Th1 or Th2, the collision is determined to be in the OFF condition. In the ON condition, the decision circuit 42 outputs the determined result to the input-output circuit 41. The collision determination ECU 40 transmits the activation signal to the drive circuit 31 of the occupant protection device 30.

As described above, the collision determination ECU 40 determines based on the output value of the pressure sensor 20 whether the collision with the vehicle is in the ON condition or is in the OFF condition. The prompt determination of the collision according to the present embodiment will be described. As shown in FIG. 4, in two peaks of the curve in the OFF condition, one peak having a lower value is referred to as a pressure change amount P1, and the peak having a higher value is referred to as a pressure change amount P2. Conventionally, a threshold value Th3, which is obtained by adding an acceptable error to the pressure change amount P2 that is a maximum value in the OFF condition, was set so as to determine without activating the occupant protection device 30 in the OFF condition.

When the acceptable error of the threshold value Th3 is set to be relatively-large, time required for the pressure change amount to reach the threshold value Th3 may be lengthened, and thereby time to the determination of the collision may be lengthened. Thus, the threshold value Th3 is set not to exceed the maximum value of the pressure change amount in any OFF conditions in a number of collision tests, and is set to be a small value as much as possible. By setting the threshold value Th3 in this way, time before the pressure change amount in each of the ON conditions 1, 2, 3 exceeds the threshold value Th3 and the occupant protection device 30 is determined to have the need to be activated corresponds to each of determination times T1, T2, T3. In the conventional determination of the collision, the threshold value Th3 needs to be lowered so as to shorten the determination times T1, T2, T3. However, because the threshold value Th3 is set as described above, it was difficult for the threshold value Th3 to be considerably lowered.

In contrast, the collision determination ECU 40 sets the threshold values Th1, Th2 in accordance with the integration value I as described above. The threshold value Th1 is obtained by adding an acceptable error to the pressure change amount P1 in the OFF condition. Similarly, the threshold value Th2 is obtained by adding an acceptable error to the pressure change amount P2 in the OFF condition. By setting the threshold values Th1, Th2 in this way, the integration value, by which the pressure change amount in each of the ON conditions 1, 2, 3 exceeds the threshold value Th1 firstly and the occupant protection device 30 is determined to have the need to be activated, corresponds to each of determination integration values I1, I2, I3. The collision determination ECU 40 calculates the integration value based on the ON conditions 1, 2, 3, and time before the integration value reaches each of the determination integration values I1, I2, I3 corresponds to each of determination time T4, T5, T6. Therefore, as shown in FIG. 6, according to the present embodiment, the determination times can be shortened by about 1.4 to 1.6 ms compared with the conventional determination times T1, T2, T3.

The threshold values Th1, Th2 are set in advance with respect to the integration value I based on the output characteristic of the pressure sensor 20. By setting multiple threshold values, the position of the door interior space 14 can be modified and the collision detection device of the present embodiment can be applied to various collided objects and types of collisions. Thus, the collision with the vehicle can be detected more accurately, and whether the occupant protection device 30 should be activated can be determined promptly. Therefore, the reliability of the occupant protection in the collision can be improved.

An example of "an air chamber space" includes a door interior space of a vehicle door and a chamber space of a chamber member. The door interior space is a space for housing therein a window glass or the like. The chamber member is a hollow member configured to be pressed by an outer panel configuring a vehicle body or a bumper cover when a collision with a vehicle occurs in the vehicle door or the bumper cover. The chamber space is an internal space in which a pressure is changed when the chamber member is pressed. That is, the air chamber space is arranged at a vehicle inner side of the vehicle body, and is a space in which a pressure is changed when the collision occurs at a vehicle outer side thereof. The air chamber space may be tightly sealed, or may not be tightly sealed. If the air chamber space is not tightly sealed, for example, the door interior space or the chamber space can communicate with the external air, and thereby balance between a pressure in the door interior space or the chamber space and the outside atmospheric pressure can be maintained.

"An output characteristic of a pressure sensor" indicates a predetermined change with time of an output value of the pressure sensor in a collision. The output characteristic is due to a configuration around the air chamber space and a shape of a collided object. For example, in a collision test assuming a side collision of a vehicle, if a pressure change in the air chamber space arranged in the door interior space is detected, the relationship between the output value of the pressure sensor and time is indicated by a curve having multiple peaks in one region, which is due to a structure or a size of the vehicle door, a shape of a truck used in the collision test or the like rather than the bumper cover arranged at a front surface of the vehicle. In a similar collision test, although there is a time interval in a maximum value and a distance between the peaks, an output value of the pressure sensor is obtained as a substantially similar curve and shows a predetermined output characteristic. For example, a number of collision tests are performed with respect to assumed vehicle collisions, and the output characteristic of the pressure sensor is obtained from the result. Multiple values are set as threshold values based on the output characteristic of the pressure sensor, and thereby appropriate threshold values at different times can be set. Therefore, whether an occupant protection device should be activated can be determined promptly.

Other Embodiments

In the determination of the collision according to the above embodiment, the pressure change amount P is calculated based on the output value of the pressure sensor 20, and is compared with the threshold value Th1 or Th2. However, the above embodiment can be modified as described below. A differential value is calculated based on the output value of the pressure sensor 20, and the differential value is compared with a predetermined threshold value. The differential value shows behavior of a pressure change of an output value at a set present time, and is calculated as a rapid increasing tendency of a pressure in ON condition. That is, when the increasing tendency is equal to or more than a certain level, the collision determination ECU 40 determines that a collision needs to activate the occupant protection device 30. Similarly, the output characteristic of the pressure sensor 20 is shown in such a configuration, and multiple threshold values can be set. Thus, the similar effect can be obtained as in the case of calculating the integration value I. Further, as a calculation method of a value corresponding to the differential value, the collision determination ECU 40 obtains previous output values, which are back to predetermined number of times from a present time including the output value at the set present time. Next, the output values are divided into a first half part and a second half part, and a sum of the first half part and a sum of the second half part are calculated. The increasing tendency may be calculated from a difference between the sum of the first half part and the sum of the second half part. Thus, the differential value can be calculated easily, and erroneous determination can be restricted in the case where the output value of the pressure sensor 20 includes an error or noise.

In the above embodiment, the two threshold values Th1, Th2 are set in advance as threshold values in accordance with the integration value I. However, more threshold values other than the threshold values Th1, Th2 may be set based on the output characteristic of the pressure sensor 20. For example, in FIG. 5, the threshold value Th1 is changed to the threshold value Th2 at a predetermined integration value. The threshold values may be set to be changed in a stepwise fashion. Thus, the threshold values that are adapted to the output characteristic of the pressure sensor 20 can be set, and whether the occupant protection device 30 should be activated can be determined promptly. Moreover, the ROM 43 may include a map showing the relationship between the integration value I and the pressure change amount P, and thereby the collision determination ECU 40 can determine a collision more easily. In particular, the configuration using the map is useful in the case where a number of threshold values are set.

Although the door interior space 14 of the vehicle door 10 is used as the air chamber space in the above embodiment, a chamber space of a chamber member, which is a hollow member, may be used as the air chamber space. For example, the chamber member is arranged in a bumper cover at a front surface of a vehicle, and thereby the present invention can be applied to a frontal collision of the vehicle. The similar effect can be obtained in such a configuration.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A collision detection device for a vehicle, comprising:
    an air chamber space arranged in the vehicle and configured so that a pressure in the air chamber space changes in accordance with a collision with the vehicle;
    a pressure sensor configured to detect a pressure change in the air chamber space; and
    a collision determination portion configured to determine the collision with the vehicle based on an output value of the pressure sensor, wherein
    the collision determination portion calculates an integration value by integrating the output value of the pressure sensor by a time, and calculates a pressure change amount based on the output value of the pressure sensor,
    the collision determination portion determines the collision with the vehicle by comparing the pressure change amount with a threshold value set with respect to the integration value, in a relation of the pressure change amount with respect to the integration value.

2. The collision detection device according to claim 1, wherein
    the integration value of the collision determination portion is calculated by adding a first integration value and a second integration value, the first integration value being based on a previous integration value, which has been calculated by integration using output values of the pressure sensor until a previous time prior to a set present time, and the second integration value being calculated by integrating a pressure change amount by a time period between the previous time and the set present time.

3. The collision detection device according to claim 2, wherein
    the first integration value is calculated by multiplying the previous integration value and a coefficient that is set to one or a value less than one corresponding to an output value at the set present time.

4. The collision detection device according to claim 1, wherein
    the threshold value is set to a plurality of different values with respect to the integration value, based on an output characteristic of the pressure sensor in the collision with the vehicle.

5. The collision detection device according to claim 4, wherein
    the threshold value including the plurality of different values is set to a smaller value with a decrease in the corresponding integration value.

* * * * *